United States Patent
Holtmanns et al.

(10) Patent No.: US 9,021,548 B2
(45) Date of Patent: Apr. 28, 2015

(54) METHOD, APPARATUS AND COMPUTER PROGRAM TO TRANSITION A USER DEVICE SECURITY MODULE TO AN UNLOCKED LIFECYCLE STATE AND TO A LOCKED LIFECYCLE STATE

(71) Applicant: Nokia Corporation, Espoo (FI)

(72) Inventors: Silke Holtmanns, Klaukkala (FI); Rune Lindholm, Sottunga (FI)

(73) Assignee: Nokia Corporation, Espoo (FI)

( * ) Notice: Subject to any disclaimer, the term of this patent is extended or adjusted under 35 U.S.C. 154(b) by 33 days.

(21) Appl. No.: 13/707,790

(22) Filed: Dec. 7, 2012

(65) Prior Publication Data

US 2013/0152159 A1 Jun. 13, 2013

Related U.S. Application Data

(60) Provisional application No. 61/567,750, filed on Dec. 7, 2011.

(51) Int. Cl.
*G06F 21/00* (2013.01)
*G06F 21/62* (2013.01)
*G06F 21/44* (2013.01)

(52) U.S. Cl.
CPC ............... *G06F 21/00* (2013.01); *G06F 21/44* (2013.01); *G06F 21/6209* (2013.01); *G06F 2221/2147* (2013.01); *G06F 2221/2141* (2013.01)

(58) Field of Classification Search
CPC ................... H04L 2209/80; G06F 2221/2141; G06F 11/0742

USPC ............................................................. 726/1
See application file for complete search history.

(56) References Cited

U.S. PATENT DOCUMENTS

| | | | | |
|---|---|---|---|---|
| 7,826,825 | B2* | 11/2010 | Aerrabotu et al. | 455/410 |
| 7,941,184 | B2* | 5/2011 | Prendergast et al. | 455/558 |
| 2005/0045717 | A1* | 3/2005 | Rager et al. | 235/383 |
| 2006/0135208 | A1* | 6/2006 | Lee | 455/558 |
| 2006/0246872 | A1* | 11/2006 | Tarkkala | 455/411 |
| 2008/0003980 | A1 | 1/2008 | Voss et al. | 455/411 |
| 2008/0090614 | A1* | 4/2008 | Sicher et al. | 455/558 |
| 2010/0151854 | A1* | 6/2010 | Wang | 455/432.1 |
| 2010/0210240 | A1* | 8/2010 | Mahaffey et al. | 455/411 |

(Continued)

FOREIGN PATENT DOCUMENTS

| | | |
|---|---|---|
| CN | 102006584 A | 4/2011 |
| WF | WO-0025278 A1 | 5/2000 |

OTHER PUBLICATIONS

GlobalPlatform Card Specification v. 2.2.1. GlobalPlatform Inc., Doc. Ref. GPC_SPE_034, Jan. 2011 http://www.globalplatform.org/specificationscard.asp p. 30-33, p. 120, table 11-6.

(Continued)

*Primary Examiner* — Harunur Rashid
*Assistant Examiner* — Bryan Wright
(74) *Attorney, Agent, or Firm* — Harrington & Smith

(57) ABSTRACT

A method, computer program, apparatus and a secure module are described. By example, in the method there are steps of receiving a request from a first entity for a secure module to enter an unlock lifecycle state; requesting confirmation to enter the unlock lifecycle state; and if the request is confirmed, transitioning the secure module from a current lifecycle state to the unlock lifecycle state.

18 Claims, 2 Drawing Sheets

(56) References Cited

U.S. PATENT DOCUMENTS

| | | | |
|---|---|---|---|
| 2010/0210306 A1 | 8/2010 | Larsson | 455/558 |
| 2011/0130118 A1* | 6/2011 | Fan et al. | 455/411 |
| 2012/0058743 A1* | 3/2012 | Chen | 455/411 |
| 2012/0190354 A1* | 7/2012 | Merrien et al. | 455/422.1 |
| 2012/0289197 A1 | 11/2012 | Holtmanns et al. | 455/411 |
| 2014/0057597 A1* | 2/2014 | Velusamy et al. | 455/411 |

OTHER PUBLICATIONS

Final Draft—ISO/IEC JTC 1—International Standard—FDIS 7816-4: Identification cards—*Integrated circuit cards—Part 4: Organization, security and commands for interchange*; 2004 (92 pages).

SCPREQ(11)0072r6 Draft Embedded UICC Requirements Specification (Nov. 2005) (26 pages).

\* cited by examiner

METHOD, APPARATUS AND COMPUTER PROGRAM TO TRANSITION A USER DEVICE SECURITY MODULE TO AN UNLOCKED LIFECYCLE STATE AND TO A LOCKED LIFECYCLE STATE

CLAIM OF PRIORITY FROM COPENDING PROVISIONAL PATENT APPLICATION

This patent application claims priority under 35 U.S.C. §119(e) from Provisional Patent Application No. 61/567,750, filed Dec. 7, 2011, the disclosure of which is incorporated by reference herein in its entirety, as well as any exhibits and attachments filed with Provisional Patent Application No. 61/567,750.

TECHNICAL FIELD

The exemplary embodiments of this invention relate generally to mobile communication devices and methods and, more specifically, relate to a subscriber identity module (SIM) and to an embedded UICC, to a software SIM, and to SIM provisioning.

BACKGROUND

The following abbreviations are defined as follows:
CSIM CDMA subscriber identity module
ETSI European Telecommunications Standards Institute
ISIM IP Multimedia Subsystem (IMS) subscriber identity module
MNO mobile network operator
PCF policy control function
RUIM removable user identity module
SCP smart card platform
SIM subscriber identity module
SM subscription manager
USIM universal subscriber identity module The SIM lock was originally designed to be used with one physical card in a phone where only applications from one operator reside. This card is owned and issued by one operator.

An embedded UICC that can be provisioned by network operators, subscription brokers or subscription managers with a software-based SIM poses new challenges with regard to management. Note that the term software-based SIM (or simply software SIM) also encompasses ISIM; CSIM, USIM. RUIM, etc. In particular, a problem that is presented relates to UICC lifecycle management. The normal lifecycle of a UICC assumes that the UICC is owned by only one operator. Hence if a SIM lock is expired and released, and the SIM becomes unlocked, there is no risk that the SIM lock might be "switched on" again. However a different case is presented in the eUICC environment, where the eUICC is not the property of one particular operator. As a result an operator B could simply switch on the SIM lock again after the SIM lock of operator A has expired. The operator B could also potentially overwrite the SIM lock of operator A.

There possibly could be business scenarios where such a no-change-operator policy is also implemented by operator B, and the user may gain some other benefit(s) not available currently. For example, the user may sign up with a contract from operator B for a defined period of time to obtain a lower cost and/or some other benefit(s).

Reference can be made to International Standard ISO/IEC 7816-4, Identification cards Integrated circuit cards—Part 4: Organization, security and commands for interchange (and to further revisions thereof), in particular to Clause 5.3.3.2 Life cycle status byte:

"The card, files and other objects, each have a life cycle; the life cycle status allows the card and the interface device to identify the different logical security states of the use of the card, files and other objects in the card. To support flexible management of the life cycle as an attribute (see ISO/IEC 7816-9[4]), this clause defines four primary states of the life cycle in the following order.

1) Creation state
2) Initialisation state
3) Operational state
4) Termination state The life cycle status byte (LCS byte) shall be interpreted according to Table 13.

The values '00' to '0F' are interindustry.
The values '10' to 'FF' are proprietary.

TABLE 13

| Life cycle status byte | | | | | | | | |
|---|---|---|---|---|---|---|---|---|
| b8 | b7 | b6 | b5 | b4 | b3 | b2 | b1 | Meaning |
| 0 | 0 | 0 | 0 | 0 | 0 | 0 | 0 | No information given |
| 0 | 0 | 0 | 0 | 0 | 0 | 0 | 1 | Creation state |
| 0 | 0 | 0 | 0 | 0 | 0 | 1 | 1 | Initialisation state |
| 0 | 0 | 0 | 0 | 0 | 1 | — | 1 | Operational state (activated) |
| 0 | 0 | 0 | 0 | 0 | 1 | — | 0 | Operational State (deactivated) |
| 0 | 0 | 0 | 0 | 1 | 1 | — | — | Termination state |
| Not all zero | | | | x | x | x | x | Proprietary |

Referenced by tag '8A', a file LCS byte may be present in the control parameters of any file (see Table 12).

A card LCS byte may be present in the historical bytes (see 8.1.1.3). Referenced by tag '48', a card LCS byte may be present in EF.ATR (see 8.2.1.1). When it has a MF, the card is in, at least, the creation state.

NOTE Unless otherwise specified, the security attributes are valid for the operational state."

Another document of interest is SCPREQ(11)0072r14 of ETSI Smart Card Platform Requirement Group (and further revisions thereof) and, in particular, the Annex.

As a general reference one can consult, for example, 3GPP TS 22.022 V10.0.0 (2011-03) Technical Specification 3rd Generation Partnership Project; Technical Specification Group Services and System Aspects; Personalisation of Mobile Equipment (ME); Mobile functionality specification (Release 10). This document describes SIM locking and unlocking in 3GPP.

Reference can also be made to 3GPP TS 31.121 V10.0.0 (2011-04) Technical Specification 3rd Generation Partnership Project; Technical Specification Group Core Network and Terminals; UICC-terminal interface; Universal Subscriber Identity Module (USIM) application test specification (Release 10).

Reference can also be made to 3GPP TS 31.102 V0.1.0 (2011-04) Technical Specification 3rd Generation Partnership Project; Technical Specification Group Core Network and Terminals. Characteristics of the Universal Subscriber Identity Module (USIM) application (Release 10).

Also of interest herein is Draft ETSI TS 103 383 V<0.0.1> (2011-05), Technical Specification. <Smart Cards; Embedded UICC; Requirements Specification>, (and to further revisions thereof).

SUMMARY

The examples of the embodiments of this invention provide in one aspect thereof a method that comprises receiving a request for a secure module to enter an unlocked lifecycle state; requesting confirmation to enter the unlocked lifecycle state; if the request is confirmed, transitioning the secure module from a current lifecycle state to the unlocked lifecycle state; and subsequently transitioning the secure module from the unlocked lifecycle state to a locked lifecycle state.

The examples of the embodiments of this invention provide in another aspect thereof a non-transitory computer-readable medium that contains software program instructions, where execution of the software program instructions by at least one data processor results in performance of operations that comprise receiving a request for a secure module to enter an unlocked lifecycle state; requesting confirmation to enter the unlocked lifecycle state; if the request is confirmed, transitioning the secure module from a current lifecycle state to the unlocked lifecycle state; and subsequently transitioning the secure module from the unlocked lifecycle state to a locked lifecycle state.

The examples of the embodiments of this invention provide in a further aspect thereof an apparatus that comprises a processor and a memory including computer program code. The memory and computer program code are configured, with the processor, to cause the apparatus at least to receive a request for a secure module to enter an unlocked lifecycle state; to request confirmation to enter the unlocked lifecycle state; if the request is confirmed, to transition the secure module from a current lifecycle state to the unlocked lifecycle state; and to subsequently transition the secure module from the unlocked lifecycle state to a locked lifecycle state.

The examples of the embodiments of this invention provide in a still further aspect thereof an apparatus that comprises means for receiving a request for a secure module to enter an unlocked lifecycle state; means for requesting confirmation to enter the unlocked lifecycle state; means, responsive to the request being confirmed, for transitioning the secure module from a current lifecycle state to the unlocked lifecycle state; and means for subsequently transitioning the secure module from the unlocked lifecycle state to a locked lifecycle state.

The examples of the embodiments of this invention provide in yet a still further aspect thereof a secure module that comprises a storage for a Lifecycle Status byte and a policy control function configured to transition between individual ones of a plurality of lifecycle states forming a set of lifecycle states. In the secure module the set of lifecycle states comprise at least: a Creation state; an Initialisation state; an Operational state, a Termination state; and an Unlock state, and where each of the lifecycle states is identified by a particular bit combination in said Lifecycle Status byte.

The examples of the embodiments of this invention provide in yet one still further aspect thereof a secure module that comprises a storage for a Lifecycle Status byte and a policy control function configured to transition between individual ones of a plurality of lifecycle states forming a set of lifecycle states. In the secure module the set of lifecycle states comprise at least: a Creation state; an Initialisation state; an Operational state, a Termination state; and a Lock state, and where each of the lifecycle states is identified by a particular bit combination in said Lifecycle Status byte.

BRIEF DESCRIPTION OF THE DRAWINGS

Aspects of the embodiments of this invention are found in the following Detailed Description, when read in conjunction with the attached Drawing Figures, wherein.

DETAILED DESCRIPTION

ETSI TS 103 383 defines an embedded UICC as follows: a UICC which is not easily accessible or replaceable, is not intended to be removed or replaced in the terminal, and enables the secure changing of subscriptions. Note that "not intended to be removed" does not imply that it cannot be removed.

ETSI TS 103 383 defines a Mobile Network Operator (MNO) as follows: an entity providing communication services to its customers through mobile networks.

ETSI TS 103 383 defines a Subscription Manager (SM) as follows: performs the role of managing the eUICC.

ETSI TS 103 383 defines a Policy Control Function (PCF) as follows: a set of rules defined by the MNO (mobile network operator) that controls the management of the eUICC or UICC. An MNO is responsible for its own set of rules, although a SM could execute these on behalf of an MNO.

The Policy Control Function (PCF) is targeted in ETSI SCP for enforcing operator-specific rules on the eUICC. If one assumes that the PCF has endorsed a user-operator contract then this implies that the PCF is capable of this endorsement at any time, and that it should be possible to prevent a once-opened eUICC to be locked again in an unauthorized manner (e.g., in a manner not authorized by the end user). The PCF might be enforced at the SM or at the eUICC.

The exemplary embodiments of this invention extend and enhance the current lifecycle model of the UICC to prevent a new locking of the device or to allow a conditional locking of the device (e.g., the user grants permission for a new lock). To achieve this new states and corresponding indicators are introduced.

Figure 1:
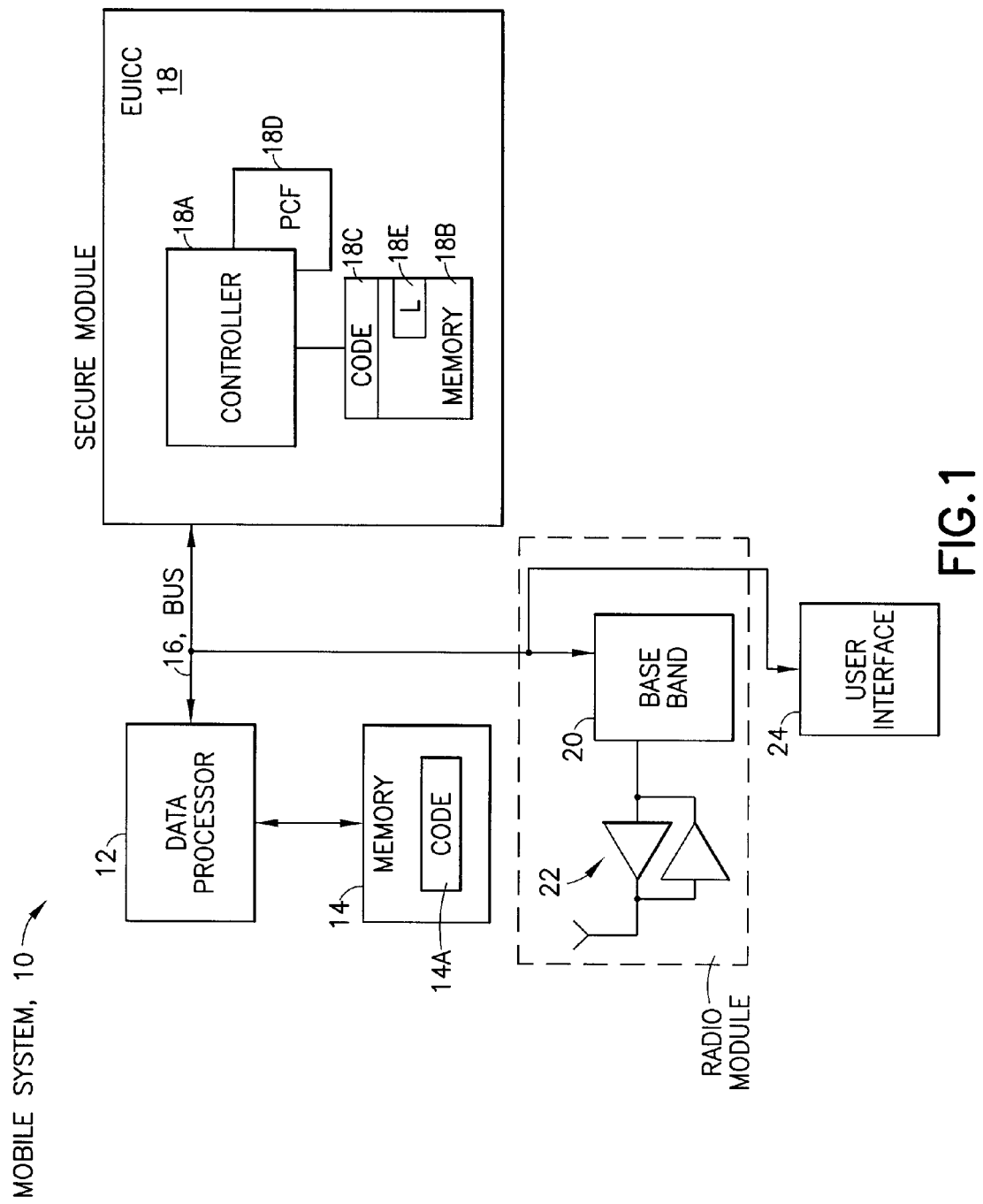
FIG. 1 is simplified block diagram of a mobile equipment that includes a secure module, such as an eUICC, that is constructed and operated in accordance with this invention.

Before describing in further detail the exemplary embodiments of this invention reference will be made to FIG. 1 for showing a block diagram of a system, such as a mobile system 10 (e.g., phone, smartphone, tablet, PDA, etc.) having at least one data processor 12, at least one memory 14 (e.g., DRAM or DRAM in combination with SRAM and/or Flash memory) that stores computer program code (instructions) 14A for execution by the data processor 12, as well as data that is used/generated during execution of the program code 14A. The mobile system 10 further includes at least one data/address/command bus 16 and, connected to the bus 16, a secure module that can be considered to embody for example an eUICC 18. The secure module may be removable, or it may be a surface mounted unit, a stand-alone chip, or a logical unit in another chip (e.g., in a radio module) as non-limiting examples of the various forms and embodiments in which the secure module can be implemented.

The eUICC 18 is operated in accordance with the exemplary embodiments of this invention. The eUICC 18 can be assumed to include some type of local control functionality such as an embedded controller 18A that operates in accordance with embedded control program code (software) 18C stored in a local memory 18B. The controller 18A may in addition also utilize external memory, such as the memory 14, and store therein cryptographically sealed data (i.e., data that is encrypted with a key that is stored in the secure module, but the encrypted data is stored outside the secure module and only loaded and decrypted in the secure module when needed). The controller 18A can be assumed to implement a PCF 18D. The secure module, while it could be provided in the form of a plug-in card, can be considered to be basically embedded in the system and to conform to the definition of the eUICC provided above.

The mobile system 10 can also include by example other components including one or more radio modules each including at least one wireless transmitter/receiver pair (transceiver) 20 and related baseband (BB) circuitry 22, as well as appropriate user interface (UI) components 24 such as, without being limiting, a touch-sensitive display screen, a microphone and speaker(s), speech recognition software, speech synthesis software and the like. Other components, including one or more cameras (not shown), can also be present depending on the specifics of the system 10.

The various components depicted can be implemented as discrete packages. Alternatively one or more, or all, of these components can be integrated into a single package, such as in a system-on-a-chip (SOC) type of package.

The UICC 18 has a strict and well-defined lifecycle model, which implies certain capabilities and restrictions on the actions that can be performed on the card (chip).

An aspect of this invention is to define a life-cycle state: Unlocked (alternatively this new lifecycle state could be referred to as Locked) in addition to those lifecycle states discussed above, i.e., the Creation state, Initialisation state, Operational state and Termination state. If this additional Unlocked lifecycle state is entered it can function as a forward reference to some storage location (L) 18E, and the information at this storage location can contain additional details such as, in one exemplary and non-limiting case, 'conditional user locking allowed'.

When the new life cycle state (Unlocked) is entered it is used to reference specific credentials that are needed for managing the UICC 18. For example, when the Unlock state is entered only those credentials that are known to the contract entity can be used to manage the UICC 18. This implies that only the MNO with which the user has a contract can manage the UICC 18 (as is currently done). The new Unlocked state has different properties associated to it than current (conventional) lifecycle states.

In order to enter the Unlock lifecycle state it is possible for a remote entity to make the request (e.g., via the radio module). In this case the entity that is currently managing the UICC 18 should confirm, and the end user can also optionally confirm the request by using, for example, the terminal user interface (UI) 24. The UICC 18 is in this case the entity that enforces that all procedures are applied prior to entering the Unlock state. It may be possible to enter the Unlock state remotely without involving the end user. As such, the UICC 18 has an important role to play when this state is entered. It can be noted that the importance of the end user is most applicable for the case when the Locked state is entered, as this will impose restrictions upon the end user (e.g., contractual obligations).

Entering the Unlock state can occur remotely without any user intervention, such as automatically when a current contract has expired by means of a trigger message (typically the presence of a contract implies the Locked state, and thus when a contract expires it is possible to automatically enter the Unlocked state using remote control functions). After exiting the Unlock state the UICC management responsibility is returned to the entity that managed it prior to the Unlock state being entered.

Where the information related to a particular life cycle state is stored is a UICC 18 internal matter. In some embodiments the secure module can contain storage for the Lifecycle Status byte. The Lifecycle Status byte can be stored in the Policy Control Function (PCF) 18D in a standardized manner where the rules can be updated. In accordance with an aspect of this invention the PCF 18D would contain in this case a new set of rules and capabilities that are bound to the lifecycle of the eUICC 18 and triggered by an entry of, for example, 0111 (LCS byte=0000 0111=Unlock).

To each state in the above-referenced International Standard ISO/IEC FDIS 7816-4 a certain set of actions is assigned that can or cannot be performed.

Further in accordance with the exemplary embodiments of this invention the lifecycle state Operational can imply that the device is Unlocked (if the alternative "Locked" is chosen to designate the new lifecycle state then the Operational state will imply that the device is Unlocked).

If the device is in the lifecycle state for Locked, then the download of subscriptions would be restricted by the contract MNO. The actual restrictions are placed in the PCF 18D for the eUICC 18, i.e., this state implies activation of PCF 18D with respect to the locked mode of operation.

In particular, when the operational profile (eUICC.USIM/ISIM/SIM/CSIM or similar) is unlocked by the MNO, or simply expires, then automatically (without user intervention) the eUICC 18 moves into the state Unlocked from where it cannot be returned to the locked state (SIM Locked state) without end user confirmation. This allows the user to enter a new "exclusive" contract with another MNO and gain thereby some benefit(s), but this only occurs with the express agreement of the user (via the UI 24).

It is pointed out that the aforementioned state transitions need not be atomic. For example, if a particular state transition requires that one or more messages be exchanged between the mobile system 10 and a wireless network then, for example, a loss of communication for some period of time can imply that whatever current state the mobile system 10 is presently in can be maintained until communication is restored with the same or a different wireless network, or some intermediate state can be entered for some period of time until a final state transition is confirmed.

Figure 2:
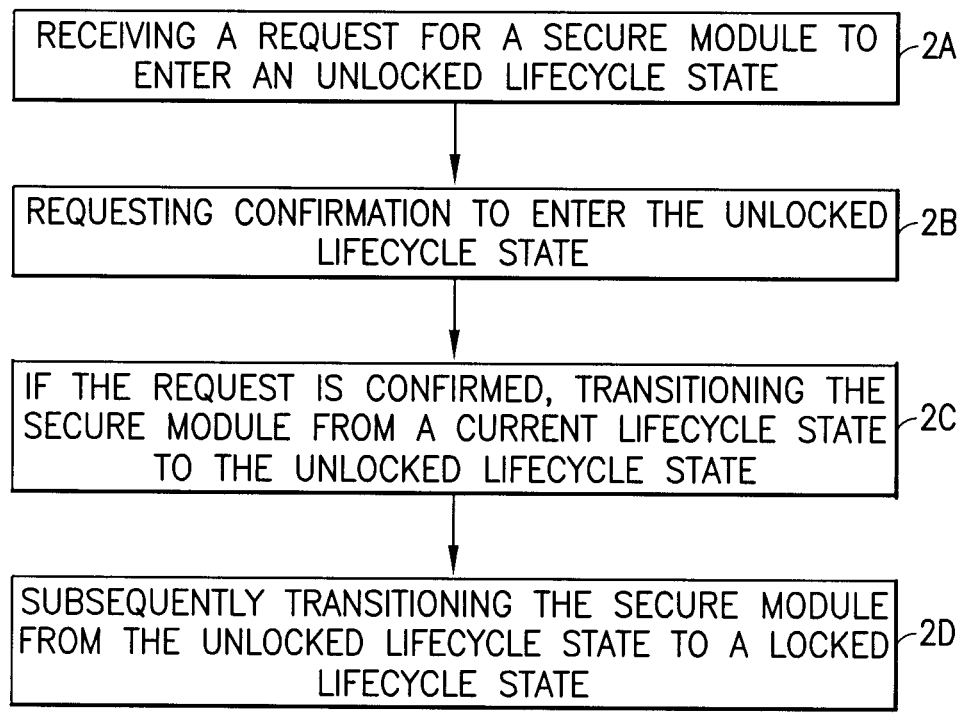
FIG. 2 is a logic flow diagram that illustrates the operation of a method, and a result of execution of computer program instructions embodied on a computer readable medium, in accordance with the exemplary embodiments of this invention.

Referring to FIG. 2, in accordance with a first method the following steps are executed. At Block 2A there is a step of receiving a request for a secure module to enter an unlocked lifecycle state. At Block 2B there is a step of requesting confirmation to enter the unlocked lifecycle state. At Block 2C there is a step, if the request is confirmed, of transitioning the secure module from a current lifecycle state to the unlocked lifecycle state. At Block 2D there is a step of subsequently transitioning the secure module from the unlocked lifecycle state to a locked lifecycle state.

In the method as in FIG. 2, where requesting confirmation comprises requesting an entity that currently manages the secure module to confirm the request to enter the unlocked lifecycle state.

In the method as in FIG. 2, where transitioning to the locked lifecycle state comprises requesting a user associated with the secure module to confirm the transition to the locked lifecycle state.

In the method as in FIG. 2 and the prior paragraph, where the user's confirmation indicates that the user has knowledge of a contract that will apply when the locked lifecycle state is entered, and where the user confirms via a user interface of a device in which the secure module is contained.

In the method as in FIG. 2, where transitioning the secure module from the current lifecycle state to the unlocked lifecycle state enables a forward reference to stored information related to operation in the unlocked life cycle state.

In the method as in FIG. 2, and further comprising transitioning the secure module from the unlocked lifecycle state to the locked lifecycle state without user intervention.

In the method as in FIG. 2, where transitioning the secure module from the current lifecycle state to the unlocked lifecycle state occurs automatically upon expiration of a current contract.

In the method as in FIG. 2, where transitioning the secure module from the unlocked lifecycle state to the locked lifecycle state returns management responsibility for the secure module returns management responsibility for the secure module to an entity that had management responsibility for the secure module when the secure module was previously in the locked lifecycle state, or to a different entity.

Note that if the state prior to the unlocked state is locked the new locked state may be under the control of a new management entity, not the same management entity as before the secure module was unlocked, or it could be under the control of the same management entity if a previous contract is renewed or is renegotiated. That is, the same 'entity' or a different 'entity' can be involved, e.g., the same network operator with a new/extended contract or a different network operator.

In the method as in FIG. 2 and the preceding paragraphs, where the operations are executed at least in part by a policy control function of the secure module.

In the method as in FIG. 2 and the preceding paragraphs, where the secure module is embodied as a UICC such as an embedded UICC.

The exemplary embodiments also encompass a non-transitory computer-readable medium that contains software program instructions, where execution of the software program instructions by at least one data processor results in performance of operations that comprise execution of the method of FIG. 2 and the preceding paragraphs.

The exemplary embodiments of this invention also provide an apparatus that comprises a processor and a memory including computer program code. The memory and computer program code are configured, with the processor, to cause the apparatus at least to receive a request for a secure module to enter an unlocked lifecycle state; to request confirmation to enter the unlocked lifecycle state; if the request is confirmed, to transition the secure module from a current lifecycle state to the unlocked lifecycle state; and to subsequently transition the secure module from the unlocked lifecycle state to a locked lifecycle state.

The exemplary embodiments of this invention also provide an apparatus that comprises means for means for receiving a request for a secure module to enter an unlocked lifecycle state; means for requesting confirmation to enter the unlocked lifecycle state; means, responsive to the request being confirmed, for transitioning the secure module from a current lifecycle state to the unlocked lifecycle state; and means for subsequently transitioning the secure module from the unlocked lifecycle state to a locked lifecycle state.

The exemplary embodiments of this invention also encompass a secure module that comprises a policy control function configured to transition between individual ones of a plurality of lifecycle states forming a set of lifecycle states, where the set of lifecycle states comprise at least: a Creation state; an Initialisation state; an Operational state, a Termination state; and an Unlock state, and where each of the lifecycle states is identified by a particular bit combination in a Lifecycle Status byte.

The exemplary embodiments of this invention also encompass a secure module that comprises a policy control function configured to transition between individual ones of a plurality of lifecycle states forming a set of lifecycle states, where the set of lifecycle states comprise at least: a Creation state; an Initialisation state; an Operational state, a Termination state; and a Lock state, and where each of the lifecycle states is identified by a particular bit combination in a Lifecycle Status byte.

In these various embodiments a UICC or an eUICC is understood to be or to represent a set of access credentials for a wireless (e.g., cellular) network and related data, and thus the embodiments of this invention also encompass the use of ISIM, SIM, CSIM, USIM and similar type of modules and credentials.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent methods and method steps may be attempted by those skilled in the art. However, all such and similar modifications of the teachings of this invention will still fall within the scope of the embodiments of this invention.

Further, the various names used for the described lifecycle states (e.g., Unlock, or Lock, etc.) are not intended to be limiting in any respect, as these lifecycle states may be identified by any suitable names. Further, the various names assigned to different types of secure modules (e.g., eUICC, UICC, USIM, ISIM, SIM, etc.) are not intended to be limiting in any respect, as these various secure modules could be identified by any suitable names.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

What is claimed is:

1. A method comprising:
   receiving a request for a secure module to enter an unlocked lifecycle state;
   requesting confirmation to enter the unlocked lifecycle state;
   if the request is confirmed, transitioning the secure module from a current lifecycle state to the unlocked lifecycle state; and
   subsequently transitioning the secure module from the unlocked lifecycle state to a locked lifecycle state;
   where transitioning to the locked lifecycle state from the unlocked lifecycle state comprises requesting a user associated with the secure module to confirm the transition to the locked lifecycle state, and
   where the user confirms the transition to the locked lifecycle state via a user interface of a device in which the secure module is contained;
   where transitioning the secure module from the unlocked lifecycle state to the locked lifecycle state comprises, in one instance, returning management responsibility for the secure module to an entity that had management responsibility for the secure module prior to the unlocked life cycle state being entered.

2. The method of claim 1, where requesting confirmation to enter the unlocked lifecycle state comprises requesting an entity that currently manages the secure module to confirm the request to enter the unlocked lifecycle state.

3. The method of claim 1, where the user's confirmation of the transition to the locked lifecycle state indicates that the user has knowledge of a contract that will apply when the locked lifecycle state is entered.

4. The method of claim 1, where transitioning the secure module from the current lifecycle state to the unlocked lifecycle state enables a forward reference to stored information related to operation in the unlocked life cycle state.

5. The method of claim 1, where transitioning the secure module from the current lifecycle state to the unlocked lifecycle state occurs automatically upon expiration of a current contract.

6. The method of claim 1, where transitioning the secure module from the unlocked lifecycle state to the locked lifecycle state transfers management responsibility for the secure module to an entity that had management responsibility for the secure module when the secure module was previously in the locked lifecycle state, or to a different entity.

7. The method as in claim 1, where the method is performed at least in part by a policy control function of the secure module, and where the secure module is embodied as a UICC or is embodied as an embedded UICC.

8. A non-transitory computer-readable medium that contains software program instructions, where execution of the software program instructions by at least one data processor results in performance of operations that comprise:
   receiving a request for a secure module to enter an unlocked lifecycle state;
   requesting confirmation to enter the unlocked lifecycle state;
   if the request is confirmed, transitioning the secure module from a current lifecycle state to the unlocked lifecycle state; and
   subsequently transitioning the secure module from the unlocked lifecycle state to a locked lifecycle state;
   where transitioning to the locked lifecycle state from the unlocked lifecycle state comprises requesting a user associated with the secure module to confirm the transition to the locked lifecycle state, and
   where the user confirms the transition to the locked lifecycle state via a user interface of a device in which the secure module is contained;
   where transitioning the secure module from the unlocked lifecycle state to the locked lifecycle state comprises, in one instance, returning management responsibility for the secure module to an entity that had management responsibility for the secure module prior to the unlocked life cycle state being entered.

9. The computer readable medium of claim 8, where requesting confirmation to enter the unlocked lifecycle state comprises requesting an entity that currently manages the secure module to confirm the request to enter the unlocked lifecycle state.

10. The computer readable medium of claim 8, where the user's confirmation of the transition to the locked lifecycle state indicates that the user has knowledge of a contract that will apply when the locked lifecycle state is entered, and where transitioning the secure module to the unlocked lifecycle state occurs automatically upon expiration of a current contract.

11. The computer readable medium of claim 8, where transitioning the secure module from the unlocked lifecycle state to the locked lifecycle state returns management responsibility for the secure module to an entity that had management responsibility for the secure module when the secure module was previously in the locked lifecycle state, or to a different entity.

12. An apparatus comprising a secure module, a user interface, a processor and a memory including computer program code, the memory and computer program code being configured, with the processor, to cause the apparatus at least to receive a request for the secure module to enter an unlocked lifecycle state; to request confirmation to enter the unlocked lifecycle state; if the request is confirmed, to transition the secure module from a current lifecycle state to the unlocked lifecycle state; and to subsequently transition the secure module from the unlocked lifecycle state to a locked lifecycle state;
   where transitioning to the locked lifecycle state from the unlocked lifecycle state comprises requesting a user associated with the secure module to confirm the transition to the locked lifecycle state, and
   where the user confirms the transition to the locked lifecycle state via the user interface of the apparatus that comprises the secure module,
   where transitioning the secure module from the unlocked lifecycle state to the locked lifecycle state comprises, in one instance, returning management responsibility for the secure module to an entity that had management responsibility for the secure module prior to the unlocked life cycle state being entered.

13. The apparatus of claim 12, where requesting confirmation to enter the unlocked lifecycle state comprises requesting an entity that currently manages the secure module to confirm the request to enter the unlocked lifecycle state.

14. The apparatus of claim 12, where transitioning the secure module from the unlocked lifecycle state to the locked lifecycle state returns management responsibility for the secure module to an entity that had management responsibility for the secure module when the secure module was previously in the locked lifecycle state, or to a different entity.

15. The apparatus of claim 12, where the secure module is embodied as a UICC or is embodied as an embedded UICC.

16. The method of claim 1, where transitioning the secure module from the unlocked lifecycle state to the locked lifecycle state, in a second instance, transfers management responsibility for the secure module to an entity other than an entity that had management responsibility for the secure module when the secure module was previously in the locked lifecycle state.

17. The computer readable medium of claim 8, where transitioning the secure module from the unlocked lifecycle state to the locked lifecycle state, in a second instance, transfers management responsibility for the secure module to an entity other than an entity that had management responsibility for the secure module when the secure module was previously in the locked lifecycle state.

18. The apparatus of claim 12, where transitioning the secure module from the unlocked lifecycle state to the locked lifecycle state, in a second instance, transfers management responsibility for the secure module to an entity other than an entity that had management responsibility for the secure module when the secure module was previously in the locked lifecycle state.

* * * * *